(12) United States Patent
Kaji

(10) Patent No.: US 6,467,689 B1
(45) Date of Patent: Oct. 22, 2002

(54) SKEW DETECTING APPARATUS, MEDIUM PROCESSING APPARATUS, MAGNETIC CARD PROCESSING APPARATUS AND CARD PROCESSING SYSTEM

(75) Inventor: Tadayuki Kaji, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/556,624

(22) Filed: Apr. 21, 2000

(30) Foreign Application Priority Data

Apr. 22, 1999 (JP) .......................................... 11-115014

(51) Int. Cl.⁷ ......................... G06K 13/00; G06K 13/06; G06K 13/067
(52) U.S. Cl. ......................... 235/475; 235/483; 235/485
(58) Field of Search ............................... 235/475, 483, 235/485; 271/227, 258.01, 259

(56) References Cited

U.S. PATENT DOCUMENTS 5,280,903 A * 1/1994 Herrick, Jr. .................. 271/251
5,483,050 A * 1/1996 Fukasawa .................... 235/449
5,681,036 A * 10/1997 Wakahara et al. ....... 271/10.12
5,689,105 A * 11/1997 Mizoguchi et al. .......... 235/475
6,059,284 A * 5/2000 Wolf et al. .................. 271/227
6,062,369 A * 5/2000 Negishi ....................... 194/207
6,209,866 B1 * 4/2001 Hosking et al. ............. 271/228
6,290,129 B2 * 9/2001 Momose ....................... 235/449

FOREIGN PATENT DOCUMENTS

JP                 403111985 A   *  5/1991 .................. 235/485

* cited by examiner

Primary Examiner—Karl D. Frech
Assistant Examiner—April A. Nowlin
(74) Attorney, Agent, or Firm—Foley & Lardner

(57) ABSTRACT

A skew detecting apparatus has a spherical roller rolling in contact with the surface of a medium guided on a medium transfer path; and skew detecting device for acquiring a skew displacement of the medium which is transferred on the basis of a degree of rolling of the spherical roller detected in both medium transfer direction and medium transfer-width direction. Accordingly, the degree of skew of the medium to be transferred is acquired to assure the normal data processing for the medium.

11 Claims, 5 Drawing Sheets

SKEW DETECTING APPARATUS, MEDIUM PROCESSING APPARATUS, MAGNETIC CARD PROCESSING APPARATUS AND CARD PROCESSING SYSTEM

BACKGROUND OF THE INVENTION

1. Field of the Invention

The present invention relates to a skew detecting apparatus for detecting the transfer state of a medium such as a magnetic card, and more particularly to a skew detecting apparatus, a medium processing apparatus, a magnetic card processing apparatus and a card processing system for precisely detecting a skew displacement of the medium to be transferred to prevent occurrence of an abnormal medium.

2. Description of the Related Art

In a card processing apparatus such as a magnetic card processing apparatus, generally, a magnetic card is guided to a card transfer path, further guided to a contact position with a magnetic head arranged on the card transfer path and the magnetic reached the contact is subjected to read and write of magnetic information.

In order to implement such processing of the magnetic card, the transfer speed of the magnetic card must be kept constant, and the slight skew of the magnetic card formed with a transfer direction must be suppressed within a prescribed angle.

The recording angle of the magnetic data is defined in the ISO standard of the magnetic card. Therefore, under the present circumstances, as shown in FIG. 5, the magnetic processing apparatus is provided with a card width-justification mechanism 54 which guides a magnetic card 51 toward a reference plane 52 under pressure using a width justification plate 53.

However, even with the provision of such a card width-justification mechanism, while the data of the magnetic card are processed, the skew degree of the magnetic card influenced by chattering vibration during its transfer cannot be known. Therefore, where the magnetic card processing apparatus is manufactured, after write for the magnetic card has been made, the skew of the magnetic data must be confirmed by a microscope to verify the performance thereof precisely.

While the width-justification mechanism operates after the verification, it cannot be known whether or not it is operating properly and the skew of the magnetic card is within a normal region. Therefore, even when its incompatibility with the ISO standard, write error and read error occur, it cannot be known whether or not these inconveniences are due to the skew of the magnetic card. The subsequent analysis of error cannot be easily made.

SUMMARY OF THE INVENTION

It is an object of the present invention to provide a skew detecting apparatus, a medium processing apparatus, a magnetic card processing apparatus and a card processing system for precisely detecting a skew displacement of the medium to be transferred to prevent occurrence of an abnormal medium which can capture the skew of a medium precisely during medium transfer by detecting not only the shift in a transfer direction of the medium but also that in its width direction, thereby preventing occurrence of an abnormal medium.

According to a first aspect of the present invention, a skew detecting apparatus comprises: a spherical roller rolling in contact with the surface of a medium guided on a medium transfer path; and skew detecting means for acquiring a skew displacement of the medium which is transferred on the basis of a degree of rolling detected in both medium transfer direction and medium transfer-width direction.

According to a second aspect of the present invention, a medium processing apparatus for processing recording information of a recording medium guided on a medium transfer path, comprises: a spherical roller rolling in contact with the surface of the medium guided on the medium transfer path; rolling degree detecting means for detecting the degree of rolling of the spherical roller in both medium transfer direction and medium transfer-width direction; and skew detecting means for acquiring a skew displacement of the medium which is transferred on the basis of the degree of rolling detected by the rolling degree detecting means.

According to a third aspect of the present invention, a magnetic card processing apparatus provided with a magnetic head for data-processing a magnetic card guided to a card transfer path, comprises: a spherical roller rolling in contact with the surface of a medium guided on the medium transfer path; and rolling degree detecting means for detecting the degree of rolling of the spherical roller in both medium transfer direction and medium transfer-width direction; and skew detecting means for acquiring a skew displacement of the medium which is transferred on the basis of the degree of rolling detected by the rolling degree detecting means.

According to a fourth aspect of the present invention, in the magnetic card processing apparatus of the third aspect, the spherical roller is arranged at a position in a card transfer-width direction corresponding to the position of the magnetic head arranged on the card transfer path.

According to a fifth aspect of the present invention, in the skew detecting apparatus of the first aspect, the medium processing apparatus of the second aspect and the magnetic card processing apparatus of the third aspect, the skew detecting means includes means for alerting a host system to occurrence of an error when it detects that the skew exceeds a limit of the skew displacement.

According to a sixth aspect of the present invention, in the card processing system comprises the magnetic card processing system according to claim 3 and a host system for processing magnetic data of the magnetic card.

In accordance with the present invention, when the skew of a medium to be transferred is detected, a spherical roller in contact with the surface of the medium to be transferred on a medium transfer path is rolled and the skew detecting means acquires a skew displacement of the medium which is transferred on the basis of a degree of rolling of the spherical roller detected in both medium transfer and medium transfer-width direction.

Thus, on the way of the transfer of the medium, the skew of the medium can be detected accurately. Therefore, it can be surely known whether or not abnormality occurs in the medium on the basis of the skew detected data.

In case of using the medium processing apparatus for processing the recorded information of a recording medium guided onto the medium transfer path, the spherical roller rolls are kept in contact with the surface of the magnetic card transferred on the card transfer path. The rolling degree of the rolling spherical roller in both medium transfer direction and medium transfer-width direction is detected by the rolling degree detecting means, and the skew detecting means can acquire the skew displacement of the recording medium on the basis of the detected rolling degree.

In case that a magnetic card is applied to a medium which is an object for skew detection in such a skew detecting apparatus or to a recording medium which is an object for processing in the medium processing apparatus, the degree of skew of the magnetic card can be detected. Therefore, when the skewed transfer which is not suitable to the processing of the magnetic data is executed, the magnetic processing for the magnetic card is attempted again. Thus, the data processing capability of the magnetic data can be improved.

Further, if the skew detecting means is arranged at a position in a card transfer-width direction corresponding to the position of the magnetic head, the processing state of magnetic data can be detected precisely at that position.

Therefore, when the magnetic card processing apparatus is manufactured, it is: not necessary to test the magnetic card having been actually subjected to the magnetic processing for write to verify the performance of the card justifying mechanism.

Further, also when the magnetic card processing apparatus operates after the verification, whether or not the skew when the card is transferred is proper can be detected accurately. Therefore, it is possible to determine whether or not the card width justifying mechanism operates properly. If occurrence of the magnetic error is prevented, reliability of the magnetic card processing apparatus is improved. Further, by constructing a card processing system which alerts a host system to the contents of the error when it has occurred, the maintenance/management of the magnetic card processing apparatus can be easily carried out.

PREFERRED EMBODIMENTS OF THE INVENTION

Figure 1:
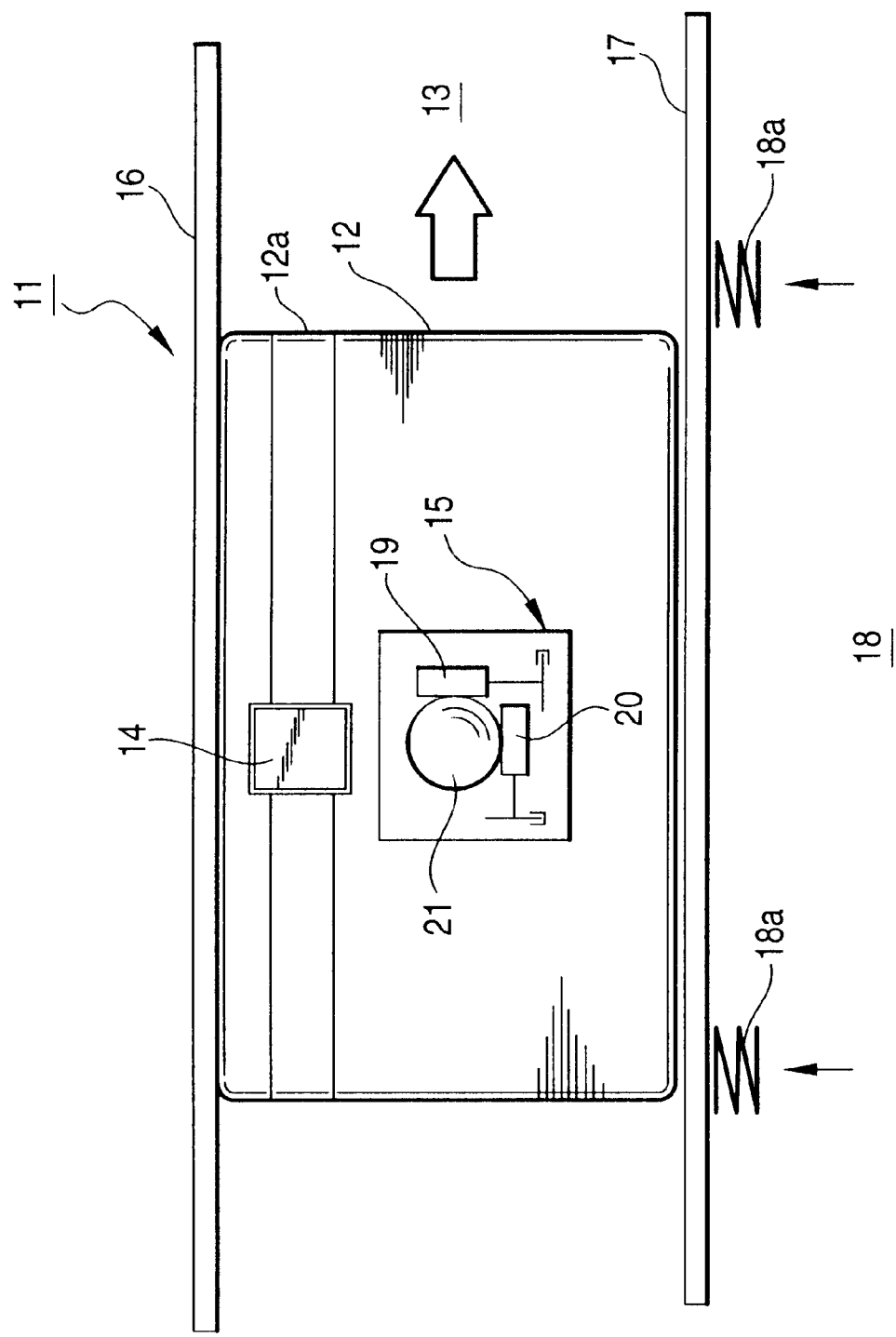
FIG. 1 is a schematic plan view of the using state of the magnetic card processing apparatus according to the present invention.

Now referring to the drawings, an explanation will be given of an embodiment of the present invention.

The drawings illustrate a magnetic card processing apparatus. As seen from FIG. 1, the magnetic card processing apparatus 11 includes a card transfer path 13 for transferring a magnetic card 12, and a magnetic head 14 arranged on the card transfer path 13 and a skew detecting device 15 which are arranged on the card transfer path 13.

On the card transfer path 13, the magnetic card 12 is transferred in a horizontal direction while its both ends are guided by the one reference guide plate 16 and the other width-justification guide plate 17 which are parallely arranged on both sides of a card transfer direction apart from each other by the width of the card to be transferred. The width-justification guide plate 17 entirely width-justifies the magnetic card 12 from the side of the width-justification guide plate 17 toward the reference guide plate 16 with the aid of the pressing function of pressing stress of pressing springs 18a, so that the magnetic card 12 is transferred linearly along the reference guide plate 16.

A magnetic head 14 is arranged on the card transfer path 13. The magnetic head 14 carries out the read/write processing for the magnetic information recoded on the magnetic card 12 while it is kept in slidable contact with the magnetic stripe 12a on the upper face of the card transferred onto the card transfer path 13.

Figure 2:
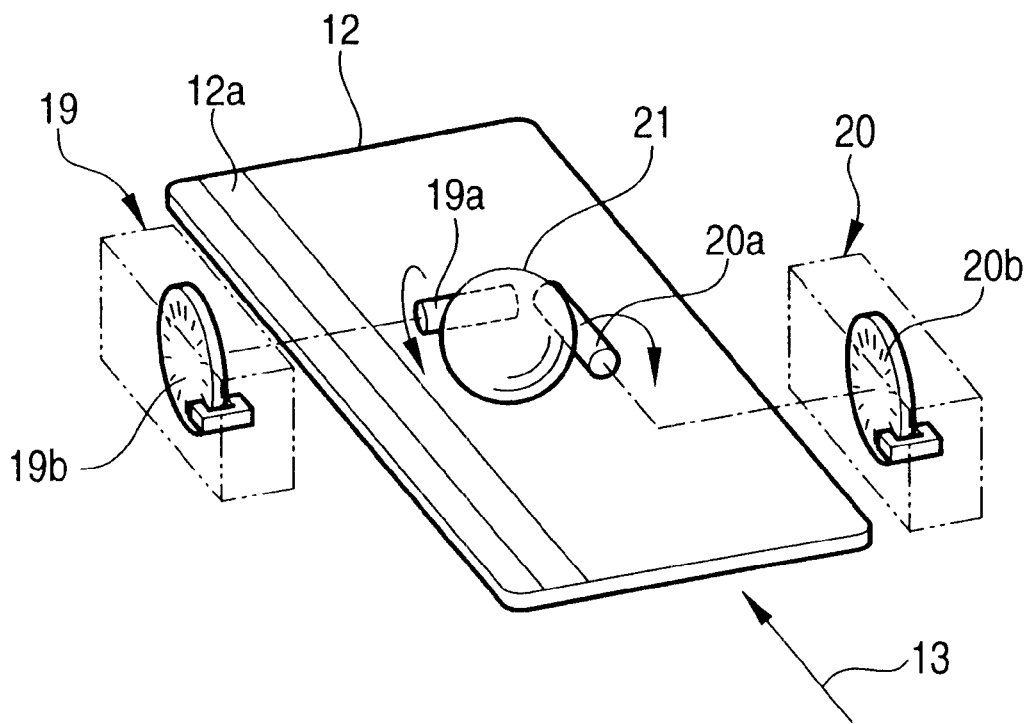
FIG. 2 is a perspective view of the detecting theory of the skew detecting apparatus according to the present invention.

A skew detecting device 15 is arranged at a position in a card transfer-width direction corresponding to the position of the magnetic head 14. The skew detecting device 15, as shown in FIG. 2, includes a transfer direction rolling degree detector 19 and a transfer-width direction rolling degree detector 20.

The transfer direction rolling degree detector 19 includes a spherical,roller 21 which rolls under a certain pressure in contact with the surface of the magnetic card 12 which is transferred on the card transfer path 13 and a front rolling shaft 19a arranged at the center position on the front side of the spherical roller 21. The front rolling shaft rolls together with the spherical roller 21. The degree of rolling of the front rolling shaft 19a is acquired by a first rotary encoder 19b to compute the degree of transfer of the magnetic card 12.

On the other hand, the transfer width-direction detector 20 includes a side rolling shaft 20a arranged at the center of the one side of the spherical roller 21. The side rolling shaft 20a rolls together with the spherical roller 21. The degree of rolling of the side rolling shaft 20a is acquired by a second rotary encoder 20b to compute the transfer degree of the magnetic card 12 in the transfer-width direction.

A CPU described later acquires the skew of the magnetic card 12 on the basis of the shift of the card in both transfer direction and transfer-width direction. According to the degree of skew, whether or not the processing state of the magnetic data is normal or abnormal is detected precisely.

Figure 3:
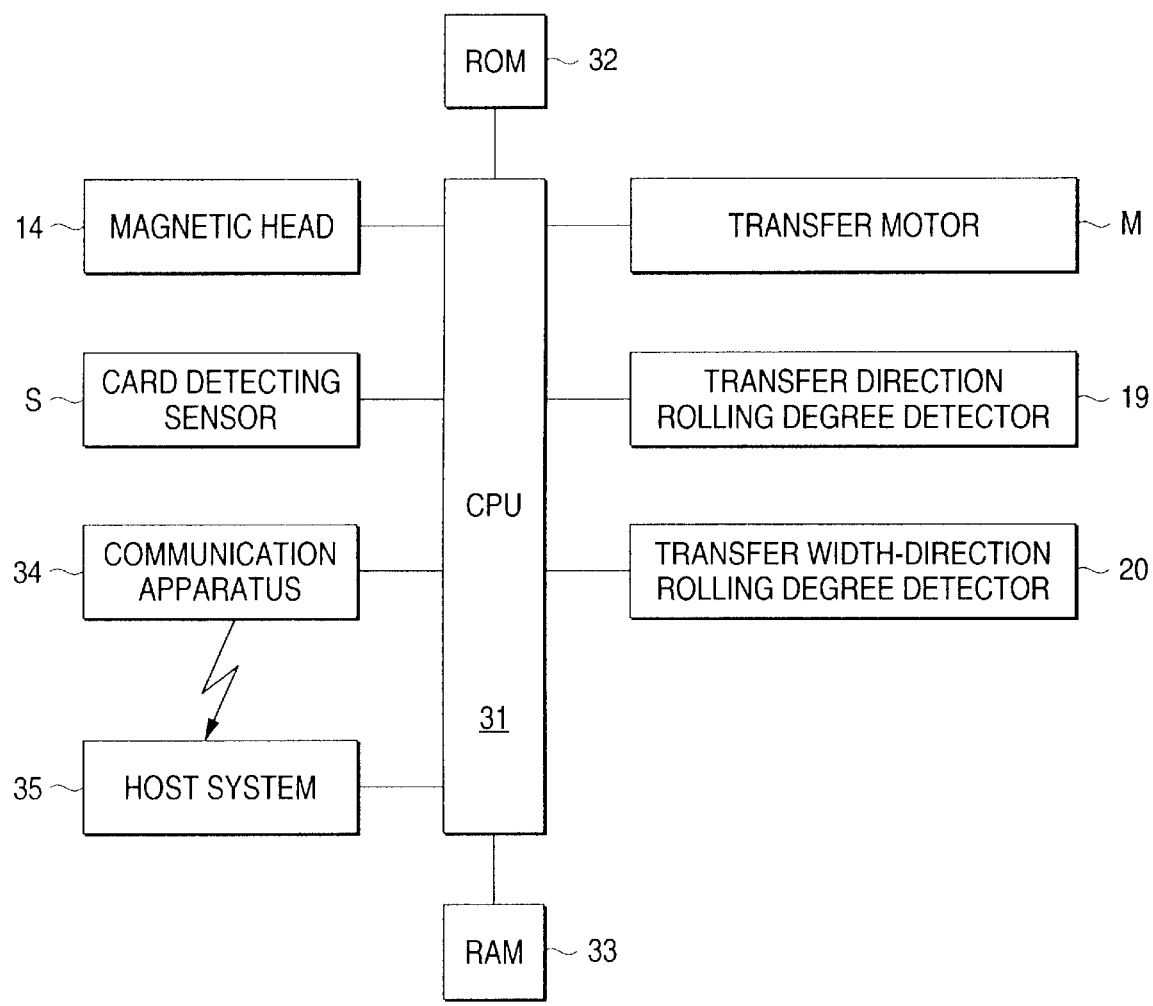
FIG. 3 is a block diagram of a control circuit of the magnetic card processing apparatus according to the present invention.

FIG. 3 is a block diagram of a control circuit of the magnetic card processing apparatus 11. The CPU 31 controls each of the circuit devices along the program stored in a ROM 32 to store readably the control data in an RAM.

A card detecting sensor S is arranged along the card transfer path 13, and detects the transfer state of the card 12 guided to the transfer path 13.

A transfer motor M drives the transfer roller (not shown) arranged on the card transfer path in both forward and reverse directions, and forward/reverse-transfers the guided magnetic card 12 in inserting and returning directions.

A communication device 34 is set so that the data processing contents when an error occurs in the other item than the transaction contents are notified to a host system such a personal computer arranged as a management apparatus for a card processing system. Thus, the data of the magnetic card processing system 11 is managed all the time so that maintenance/management can be made easier. For example, if the skew of the magnetic card acquired by the skew detecting device 15 is displayed on the screen of the host system 35, the performance of the magnetic card processing apparatus can be easily known, and maintenance/inspection such as adjustment and checking can be easily performed.

Meanwhile, the CPU 31 can precisely compute the slight skew formed under the adverse affect of chattering vibration while the magnetic card is transferred, on the basis of the rolling degree detecting data from both transfer direction rolling degree detector 19 and transfer-width direction rolling degree detector 20. Therefore, on the basis of the skew detected data, it can be accurately known whether or not the magnetic card 12 produces abnormal magnetic processing.

Thus, if the skew of the magnetic card 12 exceeds a limit, abnormality occurs in the magnetic data processing so that the magnetic processing for re-read or re-write by the magnetic head 14 at the same position as the detecting position is attempted again. Thus, the normal magnetic data processing for the magnetic card 12 is assured.

Since the skew detecting device 15 is arranged at a position in a card transfer-width direction corresponding to the position of the magnetic head 14, the skew of the magnetic card 12 can be acquired at the magnetic processing position to detect the processing state of the magnetic data.

Further, when the skew detecting device 15 is arranged at the front stage of the magnetic head 14, the skew degree of the magnetic card 12 can be detected before the magnetic data is processed by the magnetic head 14. Therefore, if the skew unsuitable for the magnetic processing by the magnetic head 14 has occurred, it can be immediately returned for reattempt. Thus, occurrence of the magnetic error for the magnetic card 12 can be prevented.

Figure 4:
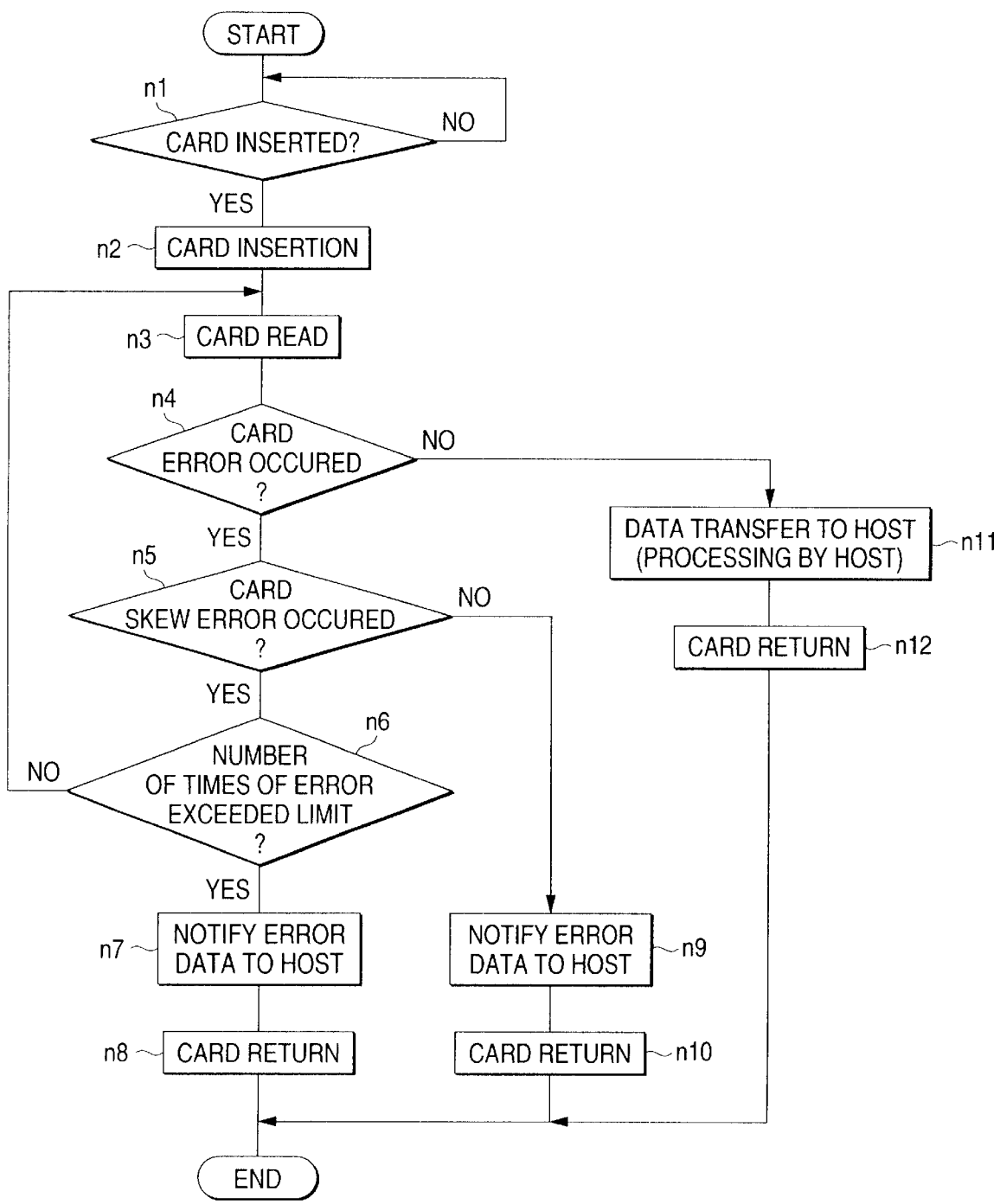
FIG. 4 is a flowchart showing the processing operation of the magnetic card processing apparatus according to the present invention.
Figure 5:
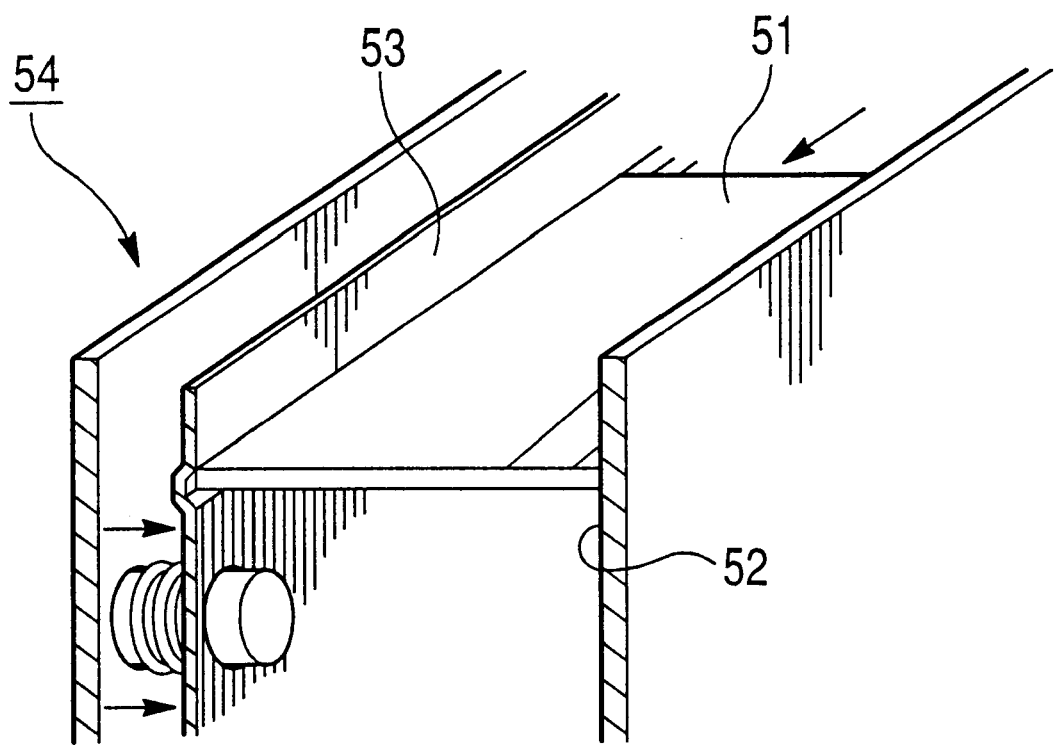
FIG. 5 is a perspective view of an example of a card width justifying mechanism in a conventional magnetic card processing apparatus.

Referring to the flowchart as shown in FIG. 4, an explanation will be given of the processing of the magnetic card processing apparatus 11 configured as described above.

Now, when the card detecting sensor S detects that the card with an input transaction signal has been inserted into the magnetic card processing apparatus 11, the transfer motor M is driven to take in the magnetic card 12 and transfer it (Steps n1–n2). The taken-in magnetic card 12 is guided to the position of the magnetic head 14 along the card transfer path 13. When the magnetic card 12 pass the position of the magnetic head 14, the magnetic data of the magnetic card 12 is read (Step n3).

When an invalid card is used, the magnetic card itself has produced a magnetic error or otherwise it is decided that the error due to the skewed transfer of the magnetic card has occurred on the basis of the rolling detected data from both transfer direction rolling degree detector 19 and transfer-width direction rolling degree detector 20 (Steps n4–n5), the number of times of error is counted. If the count value exceeds a prescribed value, it is determined that the error has occurred. In this case, since the processing of the magnetic data is not suitable, this fact is notified to the host system 34. The transaction is rejected to return the magnetic card 12 to a customer (Step n6–n8).

When an error has occurred in the magnetic card 12, in order to investigate the cause of error occurrence, the CPU 31 verifies the skew generated state of the magnetic card 12. If the skew has not been generated, it is determined that the error is attributable to the other cause than the skew. This fact is notified to the host system 34 (Step n9). The magnetic card 12 which has been determined "error" and hence is unsuitable for transaction is returned to the customer (Step n10).

On the other hand, if the magnetic card 12 is normally read by the magnetic head 14 and no error is generated, it can be determined that the magnetic card at issue is a valid card permitting transaction and the card has been properly transferred with no skew. In this case, after the normal magnetic data processing is performed (step nil), the magnetic card 12 having completed the proper transaction is returned to the customer. Thus, one transaction is completed (Step n12).

As described above, in the magnetic card processing apparatus for processing the magnetic card guided onto the card transfer path, the spherical roller rolls, being kept, under constant pressure, in contact with the surface of the magnetic card transferred on the card transfer path, the rolling degree of the rolling spherical roller in both card transfer direction and card transfer-width direction is detected by the skew detecting device, and the CPU can acquire the skew of the magnetic card on the basis of the detected rolling degree. Therefore, when the skewed transfer which is not suitable to the processing of the magnetic data is executed, the magnetic processing for the magnetic card is attempted again. Thus, the normal processing of the magnetic data can be assured.

Further, if the skew detecting device is arranged at a position in a card transfer-width direction corresponding to the position of the magnetic head, the processing state of magnetic data can be detected precisely at that position. Further, if the skew detecting device is arranged in front of the magnetic head, occurrence of the magnetic error of the magnetic card owing to unsuitable transfer can be prevented prior to the processing of the magnetic data.

Therefore, where the magnetic card processing apparatus is manufactured, it is not necessary to test the magnetic card having been actually subjected to the magnetic processing for write to verify the performance of the card justifying mechanism. Further, also when the magnetic card processing apparatus operates, whether or not the skew is proper can be detected accurately. Therefore, it is possible to determine whether or not the card width justifying mechanism which may generate the skew operates properly. In this way, the skewing state when the magnetic data are processed can be checked accurately, the data processing capability for the magnetic card is improved and reliability of the magnetic card processing apparatus is improved. By alerting the host system to the contents of the error when it has occurred, the maintenance/management of the magnetic card processing apparatus can be carried out more easily.

In the correspondence between the invention and the embodiment, the skew detecting apparatus corresponds to the skew detecting apparatus 15 in the embodiment. Likewise, the medium processing apparatus corresponds to the magnetic card processing apparatus corresponds to the magnetic card processing apparatus 11; the medium transfer path corresponds to the card transfer path 13; the medium and recording medium correspond to the magnetic card 12; and the skew detecting device and rolling degree detecting device correspond to the transfer direction rolling degree detector 19 and transfer-width direction rolling degree detector 20 which are included in the skew detecting apparatus 15 and their control system, i.e. CPU 31. However, the present invention can be realized in various applications on the basis of the technical concept defined in the claims, and should not be limited to only the configuration of the embodiment described above.

What is claimed is:

1. A skew detecting apparatus comprising:

a spherical roller rolling in contact with a surface of a medium guided on a medium transfer path; and skew detecting means for acquiring a skew displacement of the medium which is transferred on the basis of a degree of rolling detected in both directions of medium transfer and width thereof of said roller.

2. A medium processing apparatus for processing recording information of a recording medium guided to a medium transfer path, comprising:

a spherical roller rolling in contact with a surface of the medium guided on the medium transfer path;

rolling degree detecting means for detecting the degree of rolling of said spherical roller in both medium transfer direction and medium transfer-width direction; and skew detecting means for acquiring a skew displacement of the medium which is transferred on the basis of the degree of rolling detected by said rolling degree detecting means.

3. A magnetic card processing apparatus comprising:

a magnetic head for data-processing a magnetic card guided to a card transfer path;

a spherical roller rolling in contact with a surface of the card guided on the card transfer path;

rolling degree detecting means for detecting the degree of rolling of said spherical roller in both a card transfer direction and card transfer-width direction; and skew detecting means for acquiring a skew displacement of the card which is transferred on the basis of the degree of rolling detected by said rolling degree detecting means.

4. The magnetic card processing apparatus according to claim 3, wherein the spherical roller is arranged at a position in a card transfer-width direction corresponding to a position of the magnetic head arranged on the card transfer path.

5. The skew detecting apparatus according to claim 1, wherein the skew detecting means includes means for alerting a host system to occurrence of an error when the skew detecting means detects that the degree of skew exceeds a limit of the skew displacement.

6. The medium processing apparatus according to claim 2, wherein the skew detecting means includes means for alerting a host system to occurrence of an error when the skew detecting means detects that the degree of skew exceeds a limit of the skew displacement.

7. The magnetic card processing apparatus according to claim 3, wherein the skew detecting means includes means for alerting a host system to occurrence of an error when the skew detecting means detects that the degree of skew exceeds a limit of the skew displacement.

8. A card processing system comprising the magnetic card processing system according to claim 3 and a host system for processing magnetic data of the magnetic card.

9. The skew detecting apparatus according to claim 1, wherein the spherical roller is induced to roll exclusively through engagement with the medium as it moves therepast.

10. The skew detecting apparatus according to claim 2, wherein the spherical roller is induced to roll exclusively through engagement with the medium as it moves along the medium transfer path.

11. The skew detecting apparatus according to claim 3, wherein the spherical roller is induced to roll exclusively through engagement with a card as it moves along the card transfer path.

* * * * *